Patented Mar. 17, 1953

2,631,950

UNITED STATES PATENT OFFICE 2,631,950

METHOD OF AND COMPOSITION FOR REMOVING RUST AND SCALE

Myer Rosenfeld, Aberdeen, and Charles F. Pickett, Bel Air, Md.

No Drawing. Application September 27, 1949, Serial No. 118,182

10 Claims. (Cl. 134—3)

(Granted under Title 35, U. S. Code (1952), sec. 266)

The invention described in our application may be manufactured and used by or for the Government for governmental purposes without the payment to us of any royalty thereon.

This invention relates to a composition or solution for cleaning metal.

More particularly the invention is concerned with a composition of matter or solution for removing iron rust and scale from metal, especially iron rust and scale which accumulate on the iron and other metal surfaces of the cooling systems, including cylinder blocks and radiators, of internal combustion engines. The circulation of water in the cooling systems of internal combustion engines causes rust to form on the interior surfaces of the water jackets of the cylinder blocks and this rust in part becomes detached and deposits in the radiators. In addition, since the water which is introduced into such cooling systems as the liquid circulating cooling medium usually naturally contains small quantities of salts in solution, such as calcium bicarbonate, magnesium bicarbonate, or calcium sulphate, or mixtures of these salts, the heating and evaporation of the water in the cooling system give rise to deposits or incrustations of calcium carbonate, magnesium carbonate and calcium sulphate, or mixtures of these salts, which tenaciously adhere to the inner surfaces of the channels of the radiators and water jackets of engine or cylinder blocks. The composition of such deposits or incrustations will depend upon the chemical content of the water used. The salts specifically referred to are the usual chemical impurities in water. These deposits or incrustations are referred to herein as "scale" and are to be distinguished from the black oxide of iron which forms on iron and steel when they are heated to red heat or above in contact with the oxygen of the air. This black oxide of iron is usually referred to in the field of metallurgy as "scale," but this scale is not, as hereinbefore pointed out, the "scale" with which the present invention is concerned.

Among the objects of the present invention is the provision of a composition of matter or solution for removing iron rust and scale (as defined above) from metal surfaces in an effective manner without detrimental corrosive action upon the iron or other metal surfaces from which the rust and scale are to be removed.

A further object of the present invention is the provision of a solution or composition of matter which, while removing iron rust and scale from metal surfaces, as from the interior surfaces of the cooling systems of internal combustion engines, is only very slightly corrosive as regards aluminum parts or fittings that may form part of such cooling systems, and only very slightly corrosive of joints made by soldering with alloys composed essentially of lead and tin.

Solutions of oxalic acid in water have long been known as effective agents in removing rust from iron and steel. However, water solutions of oxalic acid are not very effective agents in removing scale when it contains or consists of calcium sulphate. We have found that if hydrolyzable chlorides of trivalent metals are used in water solution with oxalic acid, a composition results which not only removes rust from iron or steel but also removes scale even when the latter contains or consists of calcium sulphate. Neither the oxalic acid alone nor the hydrolyzable chloride of trivalent metal alone in water solution is as effective in removing both iron rust and scale as a mixture of the two in water solution. We believe that this combinative action may be explained as follows: In the presence of water the hydrolyzable chloride of the trivalent metal hydrolyzes in part to produce hydrochloric acid. While such hydrochloric acid may be in part consumed by reaction with carbonates contained in the scale, its concentration will be continually renewed by progressive hydrolysis of unhydrolyzed portions of the hydrolyzable chloride of the trivalent metal. This hydrochloric acid in water solution in the presence of oxalic acid causes more calcium sulphate of the scale to go into solution than would be the case if the scale were treated by aluminum chloride alone or oxalic acid alone in water solution or by water alone. As the water solution of the hydrolyzable chloride of the trivalent metal tends to become saturated with calcium sulphate, or if saturation is momentarily attained, the state of saturation is prevented or destroyed by the oxalic acid which reacts with calcium sulphate, or calcium ions, in solution to produce calcium oxalate. Calcium oxalate is far less soluble than calcium sulphate and therefore precipitates from the solution, thus placing the solution in condition to remove more calcium sulphate from the scale.

As examples of hydrolyzable chlorides of trivalent metals that economically may be used in combination with oxalic acid in practicing the present invention, aluminum chloride and ferric chloride are mentioned. The quantities of these ingredients to be used per liter of water may be varied within wide limits, and obviously will be chosen by the person skilled in the art according to the final degree of cleaning effect desired. In general, the rust removal becomes more effective as more oxalic acid is used. The hydrolyzable chloride of a trivalent metal should be used in such quantity per liter as to yield sufficient concentration of hydrochloric acid to dissolve the calcium sulphate from the scale in the time allotted for that purpose under the conditions of temperature at which the solution of the said two ingredients in water is employed. In general, increase in temperature of the treating solution is accompanied by an increase in rate of removal of rust and scale. Obviously, the mixture of the reagents or of their solution in water should be free or substantially free of materials that destroy or tend to destroy the combinative effect mentioned above.

As illustrative of the practice of the present invention, the following specific examples are given:

Example 1

A composition is prepared by mixing the following ingredients in the indicated proportions, the parts being by weight:

| | Parts |
|---|---|
| Oxalic acid, hydrated ($C_2H_2O_4.2H_2O$) | 26.6 |
| Aluminum chloride, hydrated ($AlCl_3.6H_2O$) | 3.4 |

These proportions represent about 93.5 mol percent of oxalic acid and about 6.5 mol percent of aluminum chloride hexahydrate.

Thirty grams of this mixture are used with one liter of water. From the volume of water in liters required to fill the cooling system of an internal combustion engine, the number of grams of mixture of oxalic acid and aluminum chloride for this volume can be readily obtained by multiplying this volume in liters by thirty. This calculated number of grams of mixture may be introduced directly into a partly water filled cooling system of an internal combustion engine. The engine is then run for a few minutes to produce circulation and distribution of the mixture, whereupon the cooling system is filled with water. After this filling of the cooling system with water, the engine is run from about one hour to one and one-half hours to continually circulate and heat the solution. The engine speed is regulated to give a cooling system temperature of from 160° F. to 180° F. during this latter circulation of the mixture. Instead of introducing the mixture as a mixture of solids into the cooling system of the internal combustion engine, the mixture may be preliminarily dissolved in a few liters of water and this solution introduced into the cooling system, care being taken, if necessary, to first drain from the cooling system sufficient water to provide room for the preliminarily prepared mixture. The cooling system, if not then full, is filled with water and the engine run for the time stated above when the mixture as a solid was introduced into the cooling system. Other modes of introducing the ingredients of the composition into the cooling system of an internal combustion engine will be readily perceived by the person skilled in the art in view of the foregoing explanations. In order to shorten the time required to dissolve the mixture of oxalic acid and hydrolyzable chloride of the trivalent metal, in this example aluminum chloride, the mixture may be finely ground, or the individual components thereof may be separately finely ground and thereafter intimately mixed.

Example 2

The procedure of this example is the same as Example 1 except that the mixture used is prepared by mixing the following ingredients in the indicated proportions, the parts being by weight:

| | Parts |
|---|---|
| Oxalic acid, hydrated ($C_2H_2O_4.2H_2O$) | 50.0 |
| Aluminum chloride, hydrated ($AlCl_3.6H_2O$) | 3.4 |

These proportions represent about 96.5 mol percent of oxalic acid and about 3.5 mol percent of aluminum chloride hexahydrate.

Example 3

The procedure of this example is the same as Example 1 except that the mixture used is prepared by mixing the following ingredients in the indicated proportions, the parts being by weight:

| | Parts |
|---|---|
| Oxalic acid, hydrated ($C_2H_2O_4.2H_2O$) | 20.0 |
| Aluminum chloride, hydrated ($AlCl_3.6H_2O$) | 3.4 |

These proportions represent about 91.7 mol percent of oxalic acid and about 8.3 mol percent of aluminum chloride hexahydrate.

Example 4

The procedure of this example is the same as Example 1 except that the mixture used is prepared by mixing the following ingredients in the indicated proportions, the parts being by weight:

| | Parts |
|---|---|
| Oxalic acid, hydrated ($C_2H_2O_4.2H_2O$) | 26.6 |
| Aluminum chloride, hydrated ($AlCl_3.6H_2O$) | 10.2 |

These proportions represent about 83.6 mol percent of oxalic acid and about 16.4 mol percent of aluminum chloride hexahydrate.

Example 5

The procedure of this example is the same as in any of the preceding examples except that hydrated ferric chloride (e. g., $FeCl_3.6H_2O$) is used instead of hydrated aluminum chloride in proportions molecularly equivalent to the latter.

Thus following Example 1 the proportions of oxalic acid, hydrated and ferric chloride, hydrated will be 93.5 mole percent to 6.5 mole percent approximately. And following Example 2 the proportions will be 96.5 mole percent to 3.5 mole percent of the oxalic acid and ferric chloride respectively. The proportions in brief when expressed in terms of molecular weights will be identical with the proportions when aluminum chloride is used.

Compositions according to the present invention may be prepared for marketing in any suitable form. Finely divided solid oxalic acid and finely divided aluminum chloride may be intimately mixed and packed in containers carrying directions with respect to the quantity of water in which the mixture should be dissolved, the quantity of water and proportions of oxalic acid and aluminum chloride being fixed to give a final cleaning solution according to the present invention. The two components of this mixture may in addition be packaged in a compartmentized container, one compartment holding the acid and another the aluminum chloride. Care must always be taken to protect the latter compound in its solid state from contact with moisture because of its extremely hygroscopic nature. The composition also may be prepared for marketing in the form of a concentrated water solution accompanied by directions for diluting this concentrated solution with water to give a final cleaning solution according to the invention.

We claim:

1. A composition of matter for removing iron rust and scale from metal surfaces comprising oxalic acid and hydrolyzable chloride of trivalent metal selected from the group consisting of iron and aluminum, the mole ratio of oxalic acid to hydrolyzable chloride being within a range not substantially greater than 96.5 to 3.5 and not substantially less than 83.6 to 16.4.

2. A composition of matter for removing iron rust and scale from metal surfaces comprising oxalic acid and aluminum chloride, the mole ratio of oxalic acid to aluminum chloride being within a range not substantially greater than 96.5 to 3.5 and not substantially less than 83.6 to 16.4

3. A composition of matter for removing iron rust and scale from metal surfaces comprising oxalic acid and ferric chloride, the mole ratio of oxalic acid to ferric chloride being within a range not substantially greater than 96.5 to 3.5 and not substantially less than 83.6 to 16.4.

4. An iron rust and scale removing material comprising an aqueous solution of the composition set forth in claim 2.

5. An iron rust and scale removing material comprising an aqueous solution of the composition as set forth in claim 3.

6. The process of removing iron rust and scale from metallic surfaces which comprises supplying thereto a solution containing oxalic acid and a hydrolyzable chloride of a trivalent metal selected from the group consisting of iron and aluminum, the mole ratio of oxalic acid to hydrolyzable chloride being within a range not substantially greater than 96.5 and 3.5 and not substantially less than 83.6 to 16.4, and maintaining a prolonged contact between said solution and said surfaces at an elevated temperature.

7. The process of removing iron rust and scale from metallic surfaces which comprises supplying thereto a solution containing oxalic acid and aluminum chloride, the mole ratio of oxalic acid to aluminum chloride being within a range not substantially greater than 96.5 to 3.5 and not substantially less than 83.6 to 16.4, and maintaining a prolonged contact between said solution and said surfaces at an elevated temperature.

8. The process of removing iron rust and scale from metallic surfaces which comprises supplying thereto a solution containing oxalic acid and ferric chloride, the mole ratio of oxalic acid to ferric chloride being within a range not substantially greater than 96.5 to 3.5 and not substantially less than 83.6 to 16.4, and maintaining a prolonged contact between said solution and said surfaces at an elevated temperature.

9. A composition of matter for removing iron rust and scale from metal surfaces comprising oxalic acid, hydrated, and aluminum chloride hexahydrate, the mole ratio of oxalic acid, hydrated, to aluminum chloride hexahydrate being within a range not substantially greater than 96.5 to 3.5 and not substantially less than 83.6 to 16.4.

10. The process of removing iron rust and scale from metallic surfaces which comprises supplying thereto a solution containing oxalic acid, hydrated, and aluminum chloride, hexahydrate, the mole ratio of oxalic acid, hydrated, to aluminum chloride, hexahydrate, being within a range not substantially greater than 96.5 to 3.5 and not substantially less than 83.6 to 16.4 and maintaining a prolonged contact between said solution and said surfaces at an elevated temperature.

MYER ROSENFELD.
CHARLES F. PICKETT.

REFERENCES CITED

The following references are of record in the file of this patent:

UNITED STATES PATENTS

| Number | Name | Date |
|---|---|---|
| 1,954,744 | Peterson | Apr. 10, 1934 |
| 2,318,559 | Percival | May 4, 1943 |
| 2,353,019 | Dyer | July 4, 1944 |
| 2,383,800 | Johnson | Aug. 28, 1945 |

FOREIGN PATENTS

| Number | Country | Date |
|---|---|---|
| 59,621 | Switzerland | Sept. 30, 1912 |